Patented Dec. 16, 1930

1,785,085

UNITED STATES PATENT OFFICE

HANS RICHARD HAERTEL, OF WRENTHAM, MASSACHUSETTS, ASSIGNOR TO THOMAS H. DUMPER, TRUSTEE, OF NEWTON, MASSACHUSETTS

RUBBER ARTICLES AND METHOD OF PRODUCING THE SAME

No Drawing. Application filed January 13, 1928, Serial No. 246,617. Renewed September 13, 1930.

My invention relates to the finishing of rubber articles, as for example rubber coated textiles such as are used for making raincoats.

The invention will be best understood from the following description of an example of an article made according to the invention and of one example of the practice of an improved process according to the invention, while the scope of the invention will be more particularly pointed out in the appended claims.

For giving rubber coated textiles a gloss or semi-gloss finish it has been common practice to coat the same with a film of lacquer such as shellac. The present invention has among its objects the securing of a new and improved finish for rubber surfaces, the regulating of the degree of the gloss and other characteristics determining the appearance of such finish, the hardening of the same to prevent scuffing and scratching thereof, and the eliminating of stickiness or tackiness of the surface.

The rubber may be applied to the textile sheet, which sheet commonly is of cotton, by use of the usual calendering process, it being understood that the rubber surface of the sheet leaving the calendering rolls is sticky or tacky. Commonly the rubber surface of the sheet is treated to eliminate this stickiness or tackiness before the sheet leaves the calendering machine so that it may be rolled up for convenient handling. The roll of sheeting is afterward removed to a varnishing room and varnished with shellac or other lacquer.

According to the present invention an improved finish is given to the varnished or lacquered coating by impregnating the surface thereof with a finely divided substance, as for example minute, crystalline particles which preferably are of such nature that when applied are indistinguishable from the varnish.

According to one manner of practicing the invention the surface of the sheet after the lacquer is applied may be treated with a lacquer softening agent and a solution of suitable substance which will form finely divided particles when the solution dries. With this method the character of the surface may be varied by use of more or less of the substance forming these particles. Assuming the surface of the rubber has been shellacked the surface may be treated with a liquid containing alcohol, or an equivalent shellac softening agent, plus a metal carbonate, such as zinc carbonate, the latter dissolved in ammonia. When the shellac is treated with this liquid, which liquid is volatile, the evaporation of the ammonia causes a deposit of minute, substantially colorless, and transparent crystals of zinc carbonate, while the alcohol softens the surface of the shellac to permit impregnating the same with these crystals, and further the alcohol causes the solution to "wet" the shellac surface so as to be distributed uniformly over it, which "wetting" would not occur in the absence of the alcohol. As an example of a suitable treating liquid, but without limitation thereto, I may use a solution consisting of 2 gallons of ammonia, 1 gallon of methyl alcohol, and 1 pound of zinc carbonate. I have found that treatment with this liquid will impart to the surface of the shellac a comparatively dull, "tulle" like finish very pleasing in appearance and possessing the properties of resisting scuffing and scratching with elimination of all stickiness or tackiness.

If desired the rubber surface of the coated textile, prior to being rolled up and removed from the calendering machine, may be shellacked and the surface of the shellac treated as above explained, which I have found will secure the desired finish and make it unnecessary to treat the rubber surface to eliminate the stickiness or tackiness thereof prior to shellacking. It will be observed that shellacking the rubber surface and treating the shellacked surface while the sheet is in the calendering machine eliminates the necessity of removing the roll of sheeting to a varnishing room for finishing it.

The shellac and the shellac treating liquid may be applied by use of common forms of coating apparatus employed in the art, as for example by use of the familiar apparatus comprising a roll coextensive in length with the width of the sheet and dipping at its under side into a tank containing the shellac or treating liquid while the surface of the sheet to be treated is passed over the top of the roll in contact therewith.

It has been proposed to harden and dull the surface of a shellac coating on rubber coated textiles, after the shellac is dried, by use of bromine dissolved in carbon tetrachloride, with the result that not only are the operators exposed to highly disagreeable and dangerous fumes, but an inferior product is produced. It has been found that the shellac coating is broken in the form of microscopic cracks which expose the surface of the rubber to the action of the bromine, the latter having an oxidizing action on the rubber causing it in time to deteriorate. Likewise the bromine has an oxidizing action on the shellac, the initial oxidized film in time penetrating through the film of shellac, with the result that the product has a shorter life.

The present invention is distinguished from the above mentioned process of treating the shellacked surface with bromine in that the present method does not enforce the use of substances which react chemically with the rubber and shellac, but permits when desired the use of substances inert with respect to rubber and shellac.

It will be understood that the above described materials, and the particular steps of the method described, are illustrative only, and that wide deviations may be made from these within the scope of the invention without departing from its spirit.

Claims:

1. That improvement in the method of producing rubberized textile sheets which comprises coating the surface of the rubber while tacky with shellac and after drying of the shellac wetting the same with an ammonia solution of zinc carbonate containing alcohol, and drying said solution.

2. That improvement in the method of producing rubberized textile sheets which comprises coating the surface of the rubber while tacky with shellac and afterward wetting the shellac surface with an ammonia solution of zinc carbonate containing alcohol, and drying said solution.

3. An article of manufacture comprising a rubber coated textile sheet, the surface of the rubber having a thin shellac coating the surface portion of which is impregnated with substantially invisible particles of zinc carbonate.

4. An article of manufacture comprising a rubber coated textile sheet, the surface of the rubber having a thin shellac coating the surface portion of which is coated with zinc carbonate.

5. An article of manufacture comprising a rubber coated textile sheet, the surface of the rubber having a thin shellac coating the surface portion of which is impregnated with substantially invisible zinc carbonate.

In testimony whereof, I have signed my name to this specification.

HANS RICHARD HAERTEL.